(12) United States Patent  (10) Patent No.: US 7,574,744 B2
Eagle et al.  (45) Date of Patent: *Aug. 11, 2009

(54) SYSTEM AND METHOD FOR SECURELY DUPLICATING DIGITAL DOCUMENTS

(75) Inventors: Myron Eagle, New Rochelle, NY (US); Michael Prounis, Manhasset, NY (US)

(73) Assignee: Peraogulne Corp., New York, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/580,411

(22) Filed: Oct. 13, 2006

(65) Prior Publication Data

US 2007/0033410 A1  Feb. 8, 2007

Related U.S. Application Data

(63) Continuation of application No. 10/061,802, filed on Jan. 31, 2002, now Pat. No. 7,134,020.

(51) Int. Cl.
G06F 21/00 (2006.01)
H04L 9/32 (2006.01)

(52) U.S. Cl. .................... 726/26; 713/179
(58) Field of Classification Search .......... None
See application file for complete search history.

(56) References Cited

U.S. PATENT DOCUMENTS

| 5,136,646 | A | 8/1992 | Haber et al. |
| 5,136,647 | A | 8/1992 | Haber et al. |
| 5,373,561 | A | 12/1994 | Haber et al. |
| RE34,954 | E | 5/1995 | Haber et al. |
| 5,715,441 | A | 2/1998 | Atkinson et al. |
| 5,781,629 | A | 7/1998 | Haber et al. |
| 6,266,680 | B1 | 7/2001 | Song et al. |
| 6,401,206 | B1 | 6/2002 | Khan et al. |
| 6,507,410 | B1 | 1/2003 | Robertson et al. |
| 6,587,945 | B1 | 7/2003 | Pasieka |
| 6,606,633 | B1 | 8/2003 | Tabuchi et al. |
| 7,134,020 | B2 * | 11/2006 | Eagle et al. ............. 713/176 |
| 2005/0177747 | A1 * | 8/2005 | Twede ................... 713/201 |

OTHER PUBLICATIONS

Stuart Haber and W. Scott Stornetta; "How to Time-Stamp a Digital Document," 1991, pp. 0-12.

David Bayer, Stuart Haber and W. Scott Stornetta, "Improving the Efficiency and Reliability of Digital Time-Stamping," Mar. 1992, pp. 1-6.

Stuart Haber and W. Scott Stornetta, "Secure Names for Bit-Strings," 1997, pp. 1-8.

(Continued)

Primary Examiner—Christopher A Revak
(74) Attorney, Agent, or Firm—Gardere Wynne Sewell LLP

(57) ABSTRACT

A system and method is provided for securely duplicating digital documents of disparate types, such that there is a cryptographically secure link between the duplicate and the original. The system also provides each document with a serial number that is both sequential with all other copied documents and cryptographically linked with the document itself, and which includes verifiable proof against tampering and modification. The system further produces copies of documents in a canonical format suitable for indexing and searching using automated processing tools.

27 Claims, 14 Drawing Sheets

OTHER PUBLICATIONS

Stuart Haber, Burt Kaliski and Scott Stornetta, "How Do Digital Time-Stamps Support Digital Sgnatures?" The Technical Newsletter of RSA Laboratories, Cryptobytes, Autumn 1995, pp. 1-2.

www.surety.com, "Surety.com Digital Notary Plug-in," 2000, pp. 1-11.

www.surety.com, "PDF Notary Validator for Acrobat Reader", 2000, pp. 1-8.

Michael Prounis, "It's Not Your Father's Discovery," Paper and TIFF Responses Are on the Road to Obsolenscence, Discovery & e-Evidence, Oct. 2001, pp. 8-10.

www.surety.com, "Digital Notary System Overview," Mar. 2001, pp. 1-17.

www.surety.com, "Digital Notary System Technical Overview," Mar. 2001. pp. 1-28.

www.surety.com, "Digital Notary System Architectural Overview," Mar. 2001, pp. 1-17.

Charles R. Merrill, "Time is of the Essence," CIO Magazine, Mar. 15, 2000, pp. 1-5.

Charles R. Merrill, "Time is of the Essence: Establishing the Crital Elements of Electronic Commerce," www.pkilaw.com, Jul. 13, 1999, pp. 1-6.

* cited by examiner

Notary Record 315

| Digital Fingerprint | Timestamp | Identifier | Additional Data |
|---|---|---|---|
| 510 | 600 | 610 | 620 |

FIG. 10

Log File 180

| Sequenced Filename | Original Filename |
|---|---|
| File 000 | File A |
| File 001 | File B |
| File 002 | File C |
| File 003 | File D |
| File 004 | File E |
| . | . |
| . | . |
| . | . |

FIG. 12

SYSTEM AND METHOD FOR SECURELY DUPLICATING DIGITAL DOCUMENTS

CROSS-REFERENCE TO RELATED APPLICATIONS

This Application is a Continuation of pending U.S. application for patent Ser. No. 10/061,802, filed Jan. 31, 2002, the disclosure of which is hereby incorporated by reference.

BACKGROUND OF THE INVENTION

1. Field of the Invention

The present invention relates generally to systems and methods for authenticating electronic data, and specifically to the searchability of digitally notarized electronic documents.

2. Description of Related Art

Traditionally, a paper document is validated through a notarization process, in which a Notary Public embosses a notary stamp (notary seal) on the document and signs and dates the notary seal on the document. However, with the advent of the digital age, many documents are being moved to digital form without retaining a paper copy of the document. Therefore, in order to validate the electronic document, a print-out of the document must be obtained in a format appropriate for the document. However, computer forensics has highlighted the differences between native electronic files and their paper or TIFF renditions. Such differences include certain document properties (often referred to as metadata), comments appended to business documents (e.g., notes to word processing files and PowerPoint presentations) and formulae and hidden columns in spreadsheets.

Therefore, over the past decade, a new digital notarization process has emerged to provide digital time stamping and notarization of electronic documents over the Internet. The Digital Notary® Service provided by Surety, Inc. allows users to notarize, timestamp and validate digital data of any type using client software provided to the user. Surety's Digital Notary® Service accomplishes digital notarization through a one-way hashing function that produces a digital fingerprint of the document. The digital fingerprint is transmitted over the Internet to Surety's Notary Server for notarization. After the fingerprint is notarized, the Notary Server returns a Notary Record (i.e., a small data record) to the user that contains the equivalent of a Notary Public's seal, date and signature on a paper document.

Although Surety's Digital Notary® Service provides the ability to validate digital documents, the Digital Notary® Service does not provide any medium for searching or otherwise organizing notarized digital documents. Most applications are automatically linked to some type of searching functionality. However, if there are multiple documents created using multiple applications, it can be inefficient and costly to pull up each application separately for each document to search through the documents.

In addition, some documents, such as TIFF images, must be converted to a searchable format prior to beginning the search process. The typical OCR drivers used to convert TIFF images to searchable text not only change the format of the original file, but also provide an unacceptable level of accuracy in terms of creating the searchable text component. For example, twenty thousand pages scanned at a 97 percent accuracy level will contain approximately 1.2 million errors, and it is nearly impossible to achieve a 97 percent accuracy level with non-e-mail types of business documents (e.g., spreadsheets). In these cases, the searchable text version of the TIFF image cannot be considered a valid copy of the document. Therefore, there is a need for a process that securely converts files of any format into accurate, searchable, readable and printable files capable of being digitally notarized and validated.

SUMMARY OF THE INVENTION

The present invention is directed to a system and method for securely duplicating digital documents of disparate types, such that there is a cryptographically secure link between the duplicate and the original. The system also provides each document with a serial number that is both sequential with all other copied documents and cryptographically linked with the document itself, and which includes verifiable proof against tampering and modification. The system further produces copies of documents in a canonical format suitable for indexing and searching using automated processing tools.

In one embodiment, the Portable Document Format (PDF) standard defined by Adobe is utilized as the single, canonical format for duplicate documents. The PDF format allows for full-text searching and indexing of document content, while preserving the layout and visual representation of the original document. The system utilizes the PDF format to embed arbitrary data in the file format and insert the document serial number. For example, a Notary Record for the original file and a Notary Record for the duplicated PDF file can be embedded into the duplicated PDF file to validate the duplicated PDF file. In addition, a document serial number derivable from the Notary Record for the original file can be inserted into a footer of the duplicate file to provide the cryptographically secure link to the original file.

The system is further capable of extracting individual (component) documents from compound documents (e.g., zip files, PST folders, e-mail messages and attachments, execution files and database files) for input to the digital photocopying process. Therefore, the system enables access to each component document individually, while still retaining the relationship between a component document and the compound document(s) associated with the component document.

The system further preferably includes a Repository Management Tool (RMT) for interworking with a repository storing a collection of original and duplicate documents in order to perform various operations on the files in the repository. In one embodiment, the RMT is responsible for initiating the digital photocopier process of creating a set of duplicated PDF files and validating the contents of a set of digital duplicates or originals that have already been photocopied. In addition, the RMT is capable of cross-referencing a duplicate with its original, or cross-referencing either a duplicate or the original with the document serial number. For example, the RMT can create a log file that maps the sequenced filename of the duplicate PDF file back to the filename of the original file.

One advantage of the secure digital photocopier (SDP) system is the ability to convert any file type, including, but not limited to, e-mails and attachments, business documents, presentations, photographs, calendars, schedules, forensic data and database files. In addition, the SDP system enables full-text searching of documents by key words, phrases or concepts.

Another advantage of the SDP system is the ability to track the specific treatment/disposition of a file and the status of the file, thereby providing useful "chain-of-custody" information. The "chain-of-custody" information, along with the embedded Notary Record information, enables authentication of digital evidence during a legal proceeding. In addition, the SDP system is faster, more secure and more cost-effective than current paper discovery practices. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 10 illustrates an exemplary Notary Record of the type embedded within a duplicate file;

FIG. 12 is a functional block diagram illustrating exemplary functionality for validating a duplicate file created in accordance with embodiments of the present invention;

DETAILED DESCRIPTION OF THE EXEMPLARY EMBODIMENTS

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others. It should be understood that the terms "logic" and "module" as used herein refer to the hardware, software and/or firmware required to perform the functions of the logic or module. In addition, the terms "logic" and "module" as used herein embrace, subsume, and include, inter alia, object oriented programming techniques as well as so-called traditional programming techniques such as, for example, custom-developed applications.

Figure 1:
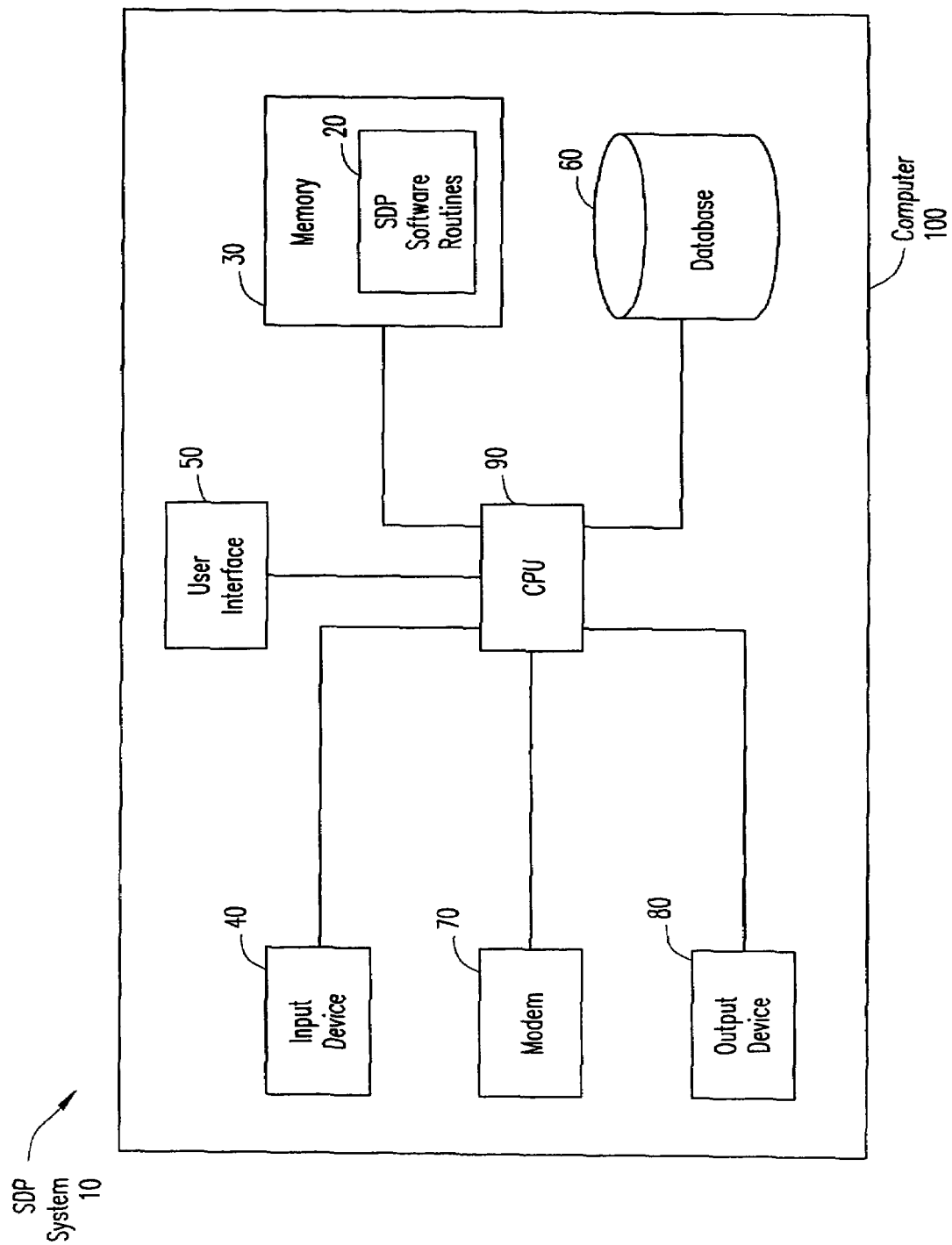
FIG. 1 is a block diagram illustrating an exemplary computer architecture for implementing a secure digital photocopier (SDP) system of the present invention.

FIG. 1 illustrates an exemplary computer 100 architecture for implementing a secure digital photocopier (SDP) system 10 for securely duplicating digital documents of disparate types to provide a cryptographically secure link between the duplicate and the original. The computer 100 can be a personal computer, server or other type of programmable processing device. The SDP system 10 is initiated and controlled by SDP software routines 20 running on the computer 100. The SDP software routines 20 are tangibly embodied in a memory 30, which can be any type of computer-readable medium, e.g., a ZIP® drive, floppy disk, hard drive, CD-ROM, non-volatile memory device, tape, etc. In addition, the memory 130 may be any memory type, such as, for example, RAM, ROM, EPROM, EEPROM, HDD or FDD.

Input device 40 is provided to supply one or more original documents for the SDP software routines 20 to perform various operations on. Input device 40 can be, for example, any type of computer-readable medium or a modem connected to receive the original documents via a data network, such as the Internet, Intranet or a local area network (LAN). The SDP software routines 20 process the received original documents and store the processed original documents as original files in database 60. Duplicate files of the original files created by the SDP software routines 20 are also stored in database 60.

It should be understood that database 60 can be realized as any type of memory implemented on any type of computer-readable medium. In addition, database 60 can be included on the same computer 100 as the SDP software routines 20, or can be stored on a separate computer or a server (not shown). For example, the SDP software routines 20 can be stored on a web server (not shown) and downloaded from the web server to the computer 100 storing the database 60 or to a different computer (not shown) that has access to the database 60 directly or via a data network (e.g., Internet, Intranet or LAN). In addition, database 60 can include multiple databases for storing the original and duplicate files.

User interface 50 provides instructions to the SDP software routines 20 from a user of the SDP system 10 and/or supplies data to the user from the SDP software routines 20. For example, user interface 50 can include one or more of a monitor or other type of display device, printer, keyboard, mouse, speaker(s), voice command software, touch screen, wireless device (for remote control or access via a wireless network) or remote input system (for access via a data network or another computer). User interface 50 connects to an Application Program Interface (API) (not shown) within the SDP software routines 20 to select or enter various parameters related to the duplication of documents.

Notarization of both original and duplicate files stored in database 60 is performed via modem 70, which can be any device capable of transmitting and receiving data via a data network. Modem 70 provides a data connection to a Notary Service Provider (NSP) responsible for notarizing the files. For example, in preferred embodiments, the NSP is Surety Digital Notary SDK® and/or Surety Digital Notary.com®. Copies of the duplicate files are provided via output device 80. For example, output device can include one or more of a monitor or other type of display device, printer, modem or any computer-readable medium.

Central Processing Unit (CPU) 90 controls the creation of the duplicate files by the SDP software routines 20, the storage of original and duplicate files within the database 60 and the access to an off-site Notary Service Provider via the modem 70 for notarization of files. The CPU 90 can be any microprocessor or microcontroller configured to load and run the SDP software routines 20 and access the database 60.

Figure 2:
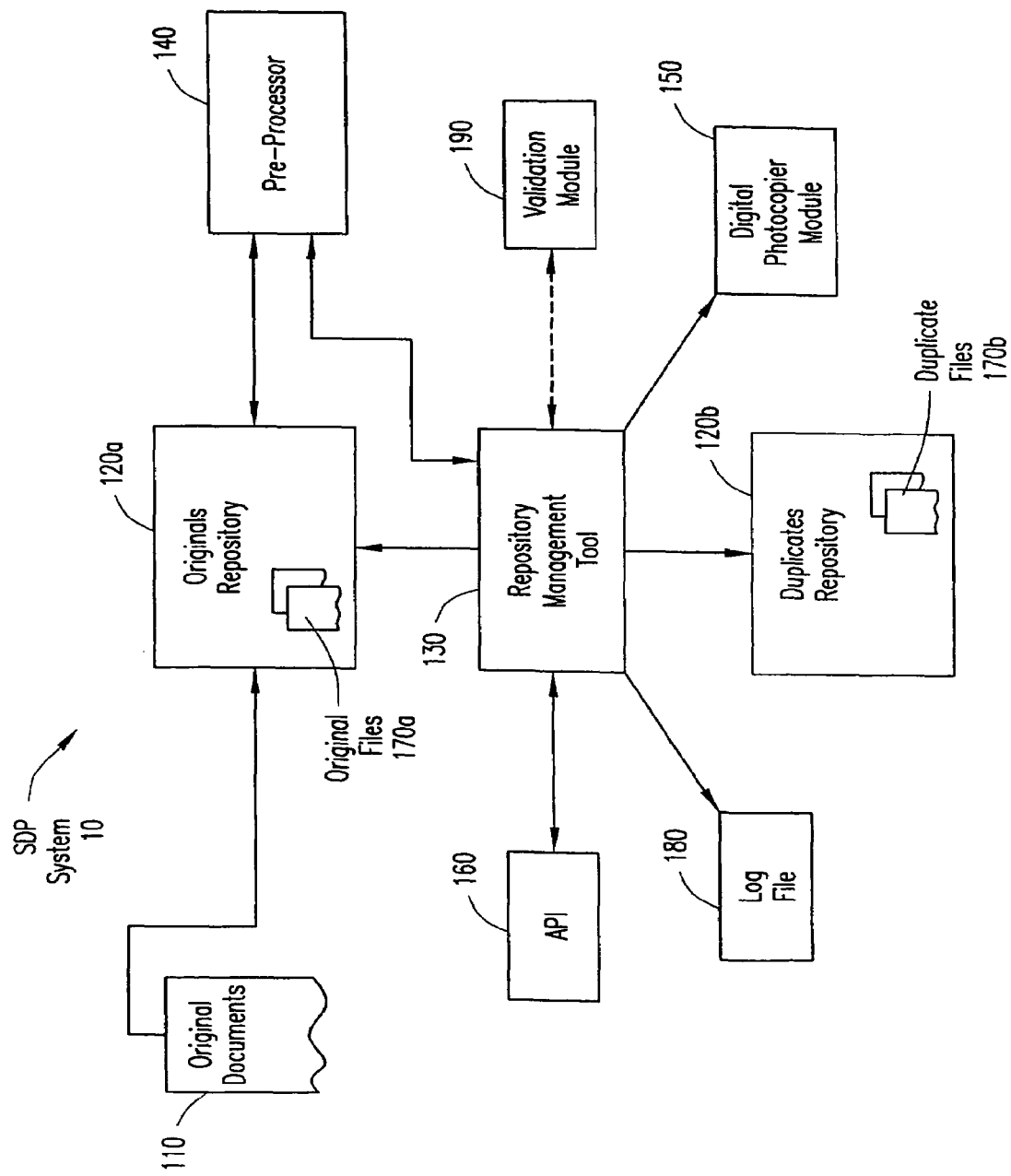
FIG. 2 is a functional block diagram illustrating exemplary components of the SDP system of the present invention.

The operation of the SDP system 10 will now be described with reference to FIG. 2. Original documents 110 are input to the SDP system 10 and stored in an originals repository 120*a* as original files 170*a*. A repository 120 as used herein is a directory structure of files. The specific structure of the directories can be defined by the specific circumstances of the user. However, one requirement the SDP system 10 places on the directory structure is that each file 170 in the structure contain exactly one document 110. Pre-Processor 140 interfaces with the originals repository 170*a* to populate the originals repository 170*a* with documents extracted from a compound document (e.g., an e-mail folder, e-mail with attachment(s), zip file or execution file). Other documents, which do not require pre-processing, are inserted into the originals repository 170*a* directly. In certain instances, the Pre-Processor 140 can be turned off to prevent the expansion of the compound document(s). In that case, the compound document is treated as a single document for notarization and processing purposes.

Repository Management Tool (RMT) 130 coordinates the population of the originals repository 120*a* and performs various operations on the original files 170 in the originals repository 120*a*. The RMT acts as the CPU for the SDP system 10, and can be implemented using any combination of hardware, software or firmware. For example, the RMT 130 can initiate the Pre-Processor 140 on documents that need preprocessing. The RMT 130 can also initiate the secure digital photocopying process on individual original files 170*a* or groups of original files 170*a*. In addition, the RMT 130 can access Validation Module 190 to validate the contents of a set of digital duplicate files 170*b* or original files 170*a* that have already been photocopied. Furthermore, the RMT 130 can cross-reference a duplicate file 170*b* with its original file 170*a*, or cross-reference either the duplicate file 170*b* or the original file 170*a* with a document serial number (hereinafter referred to as a Virtual Identification Number) assigned to the duplicate file 170*b* during the secure digital photocopying process.

To initiate the secure digital photocopying process, the RMT 130 interfaces with a Digital Photocopier Module (DPM) 150 in order to create a final set of duplicated files 170*b*. In this capacity, the RMT 130 is responsible for creating a new duplicates repository 120*b* with references to the originals repository 120*a* and one or more storage bins for the duplicate files 120*b*. Multiple storage bins can be used as a way to implement "rollover" when a particular directory within a storage bin has insufficient space. The directory structure of the originals repository 120*a* is mirrored in each storage bin within the duplicates repository 120*b*.

The RMT 130 is further responsible for renaming the duplicate files 170*b*, copying the duplicate files 170*b* into the final files directory within the duplicates repository 120*b* and creating a log file 180. The log file 180 maps a sequenced filename of the duplicate file 170*b* back to the original filename of the original file 170*a*. An example of a log file 180 is shown in FIG. 12. Each duplicate file has a filename that is sequential with other duplicate files. The log file 180 lists each duplicate file sequentially and correlates that duplicate filename with the filename of the original file stored in the originals repository.

Referring again to FIG. 5, the DPM 150 is responsible for notarizing each original file 170*a*, converting each original file 170*a* into a duplicate file 170*b* having a canonical format and embedding the original notary record into the canonical format. In addition, the DPM 150 is responsible for providing each duplicate file 170*b* with a VIN that is both sequential with all other duplicated files and cryptographically linked with the original file 170*a*. The DPM 150 is further responsible for notarizing the duplicate file 170*b* and embedding the duplicate notary record into the duplicate file 170*b*. In preferred embodiments, the notary records are embedded in the duplicate file 170*b*, however, it should be noted that in other embodiments the notary records may be stored separately.

The DPM 150 presents a generic interface to the RMT 130 for converting files and embedding data into them. By abstracting away the details of file format conversion and embedding, the RMT 130 can be altered to use a different file format to convert to and embed in without modification. For example, the exposed Application Program Interface (API) to the RMT 130 can be in terms of a generic "Document." Operations that a "Document" supports include, for example: 1) embedData; 2) notarizeData; 3) readData; and 4) writeFooter. Creation of "Documents" can be done through a generic "Converter" interface. A "Converter" can accept the name of a document and return a handle to a "Document" object, which represents a duplicate file and supports the embedding, notarization, reading and writing operations discussed above.

It should be understood that there may be instances where a particular original file 170*a* will not be able to be converted to a duplicate file 170*b* (e.g., due to a virus in the original file 170*a* or an unconvertible file format). In this case, a copy of all non-convertible or failed conversion files can either be kept in an additional repository (not shown), or alternatively, the non-convertible or failed conversion files can be noted as such in the originals repository 120*a*. In addition, non-convertible or failed conversion files can be embedded in a blank (template) file having a canonical format. This would allow the production of all file types, including potentially responsive multimedia (audio and video), file types not supported by the SDP system 10, etc. The resulting blank PDF file embedded with the non-convertible or failed conversion file should follow the standard naming convention in terms of filename, as discussed hereinbelow in connection with FIG. 5, and also validate back to the original non-convertible or failed conversion file.

An Application Program Interface (API) 160 to the RMT 130 presents views to a user of the SDP system 10 on the originals repository. 120*a* and duplicates repository 120*b*. For example, three major views can be presented from the viewpoint of the original filenames, the duplicate filenames, and the Virtual Identification Numbers. Each filename view can provide multiple information about a file 170*a* or 170*b*, such as whether the document could be converted or not, the Virtual Identification Number and whether the file is to be included as discovery or an exhibit (if the SDP system 10 is being used for a legal proceeding). From each view, the user can be provided with one or more options, such as converting original files 170a to duplicate files 170b, validating original files 170a and/or duplicate files 170b, culling (deleting) files 170a or 170b that should not be included in the final duplicates repository 120b, assigning exhibit numbers to duplicate files 170b, producing the final duplicates repository 120b for delivery, producing reports of statistical information, listing the mapping between the original filename and the final filename and listing the iterations of Virtual Identification Numbers and exhibit numbers.

Figure 3:
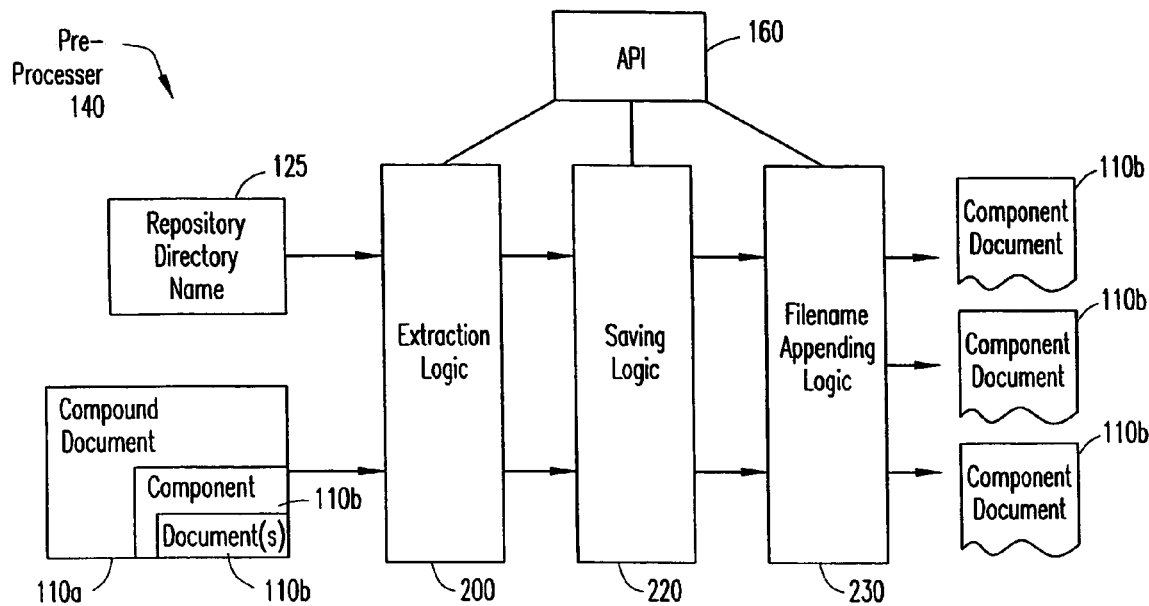
FIG. 3 is a functional block diagram illustrating exemplary functionality for pre-processing documents for input to the SDP system in accordance with embodiments of the present invention.

The operation of the Pre-Processor 140 will now be described with reference to FIG. 3. Many digital documents are in fact compound documents 110a, that is, documents that include multiple component documents 110b. Compound documents 110a include, for example, e-mail folders, e-mail messages with attachments, e-mail messages having other e-mail messages embedded therein, execution files and zip files. One example of an e-mail folder is a Personal Folder (PST) file, which is the primary output format for e-mail systems using Exchange®. Each user's messages and attachments are output from an Exchange® server as a single PST file. Each PST file can contain one or more individual e-mail messages, some of which may have attachments. The Pre-Processor 140 separates the component document(s) from the compound document(s) to enable access to each of the component documents individually, while still retaining the relationship between a component document and the compound document(s) it came from.

The Pre-Processor 140 receives as input a compound document 110 containing one or more component documents 110b (each of which could be another compound document 110a) and the name of a directory in the originals repository where the extracted component documents will be stored. The Pre-Processor 140 includes extraction logic 200 responsible for extracting the component documents from the compound document(s) and saving logic 220 responsible for storing each component document as an individual original file in the directory assigned for the compound document in the originals repository.

Storing logic further stores each component document in the directory in a hierarchical format, so that the relationships between the component documents and the compound documents is retained. As an example, if an e-mail message contains one or more attachments, a sub-directory can be created with the identifier of the e-mail message combined with the word "attachments," and the attachments for that e-mail message can be stored in the sub-directory. The format of the original file can be, for example, a text file, a MSG file, a Microsoft Word® file, a RTF file, a HTML file or a Vcard file. Filename appending logic 230 appends a filename to the original file stored in the originals repository. The filename can be derived from the component document filename or can be a unique filename. For example, for PST files, the filename for an individual e-mail message can be the unique identifier that Exchange® assigns to each e-mail message.

The user can interface to the Pre-Processor 140 through the API 160. For example, in preferred embodiments, the API 160 can provide two paths that the user needs to specify before the Pre-Processor 140 can begin processing. The first path is the path of the compound document 110a to process. The second path is the directory where the extracted component documents 110b will be stored. The default name 125 of the directory is the filename of the compound document 110a followed by underscore followed by the type of compound document 110a, e.g., PST. The API 160 can further provide the user with feedback to show the progress of the pre-processing (e.g., in the form of a progress bar). In alternative embodiments, the API 160 can provide the user a tree view of the compound document 110a and allow the user to select which component documents 110b should be extracted. In further alternative embodiments, the API 160 can provide the user a tree view of the results that shows the mapping between the original component document 110b and the corresponding extracted and saved original file in the originals repository.

Figure 4:
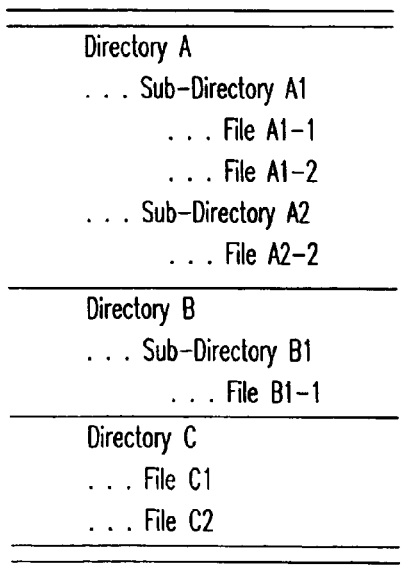
FIG. 4 is a logical representation of an exemplary repository for storing original and duplicate files in accordance with embodiments of the present invention.

An example of the directory structure of the originals repository 120a after pre-processing is shown in FIG. 4. Each directory can include one or more files. In addition, each directory can consist of one or more sub-directories, each including one or more files. In this way, the relationship between files (such as component files and compound files) is maintained.

Figure 5:
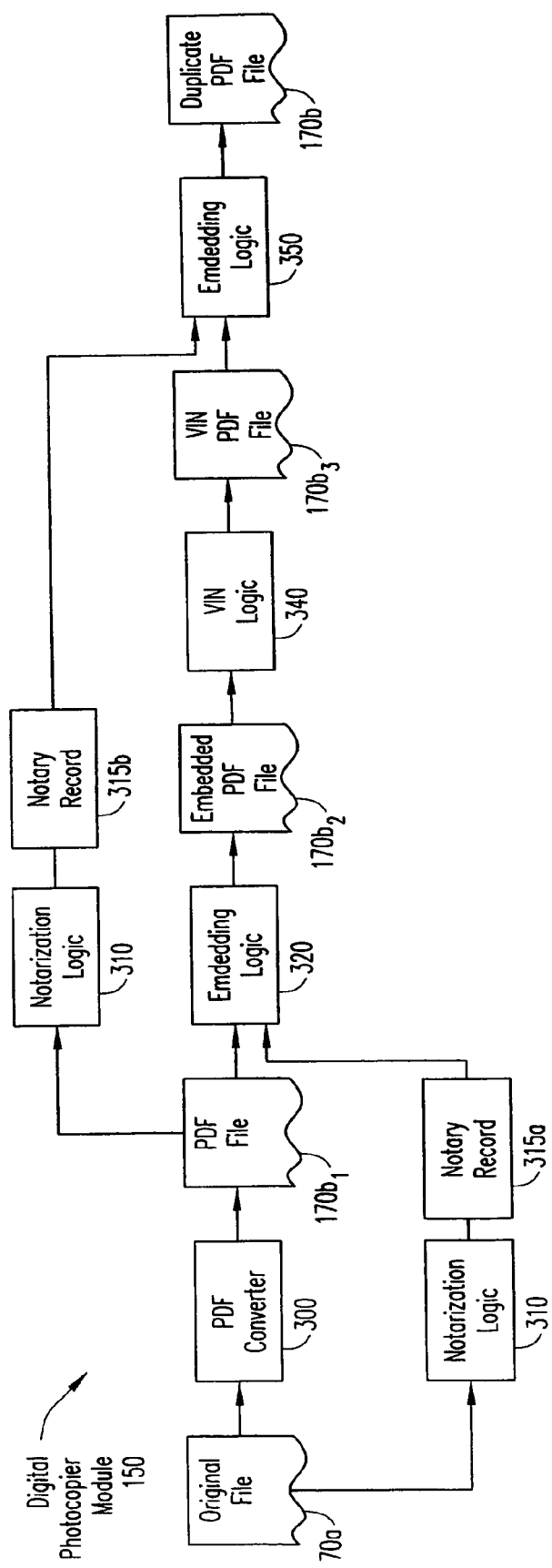
FIG. 5 is a functional block diagram illustrating exemplary functionality for creating a digitally notarized duplicate file that is cryptographically linked to the original file in accordance with embodiments of the present invention.

The operation of the Digital Photocopier Module (DPM) 150 will now be described with reference to FIG. 5. In FIG. 5, the Portable Document Format (PDF) standard defined by Adobe is utilized as the single, canonical format for duplicate documents. PDF allows for full-text searching and indexing of document content, while preserving the layout and visual representation of the original. In addition, PDF allows for the embedding of arbitrary data in the file format, which facilitates a number of operations required to realize the SDP system. PDF also allows for programmatic modification of the visual content of the file, which facilitates the insertion of the Virtual Identification Number (VIN). Finally, PDF includes a rudimentary locking facility, which at least reduces the likelihood of inadvertent modification after the duplicates are produced. However, it should be understood that other canonical formats may be used instead of the PDF described herein.

An original file 170a is notarized using notarization logic 310 to produce a Notary Record 315a. As an example, the notarization logic 310 can be implemented as the client software provided by the Surety's Digital Notary® Service. The original file 170a is further passed to a PDF converter 300 for conversion of the original file 170a into a PDF file $170b_1$. As an example, the PDF converter 300 can be implemented at least in part as an Adobe tool, such as the PDFWriter®, capable of creating PDF documents from other document formats, such as those found in the Microsoft Office 2000® suite. The PDFWriter® software component acts as a printer driver for Windows® applications, which captures printer output and generates a PDF file representing that output. Additional functionality can be added to tools, such as the PDFWriter®, to convert other types of documents having formats not supported by the Microsoft Office 2000® suite.

The resulting filename of the PDF file $170b_1$ can be, for example, the original filename followed by underscore followed by the extension of the original file plus the PDF extension. For example, if the original filename is "myfile.doc", the corresponding PDF filename can be "myfile_doc.pdf.". If the original file is a component file of a compound document, the filename of the PDF file $170b_1$ can be, for example, a combination of the filename of the original compound file and the filename of the component file plus the PDF extension. In addition, each Notary Record 315a can be named similar to the PDF files $170b_1$, with the original filename followed by underscore followed by the extension of the original file plus the Surety Notary Record (SNR) extension.

The Notary Record 315a produced from the notarization process, along with the PDF file $170b_1$, are input to embedding logic 320 to embed the Notary Record 315a into the PDF file $170b_1$. In order to embed private data, such as Notary Record 315a, into PDF documents, a specialized add-on to Adobe Acrobat® is needed. In addition, in order to automate the converting and embedding processes, such that the processes do not require user interaction for each individual file, an additional specialized add-on to Adobe Acrobat® is needed. For example, in preferred embodiments, the DPM 150 can include an Adobe Acrobat® plug-in, built specifically to perform the data embedding, data reading and footer creation operations.

Figure 7:
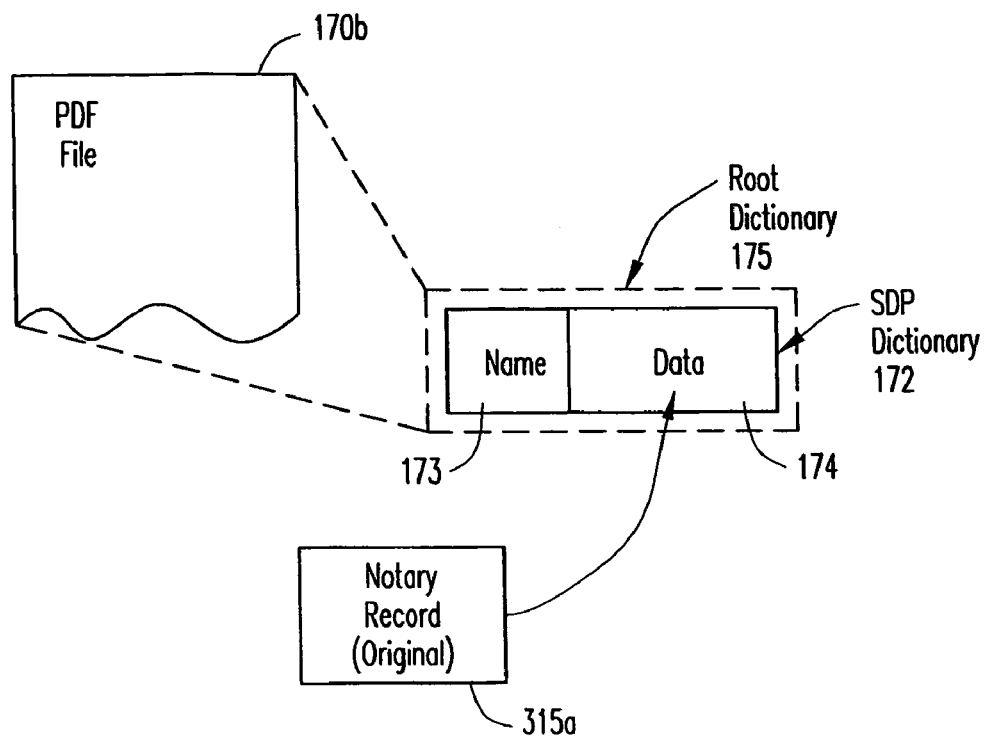
FIG. 7 is a representation of a Notary Record associated with the original file embedded within a duplicate file.

In one embodiment, the Notary Record 315a for the original file 170a can be embedded into the PDF file 170b as shown in FIG. 7. Every PDF document has a "Root Dictionary" 175, where the term "Dictionary" refers to a data structure containing a name 173 and associated data 174 (e.g., a number, text, an array of numbers or another dictionary). The embedding logic 320 of FIG. 5 creates a new SDP Dictionary 172 having a name 173 known to the SDP system and stores this new SDP Dictionary 172 in the Root Dictionary 175. The Notary Record 315a is stored inside the data 174 section of the SDP Dictionary 172. Therefore, the Notary Record 315a is now a part of the PDF file. 170b, but has no visual component (i.e., nothing about the PDF file's 170b appearance has changed).

Figure 6:
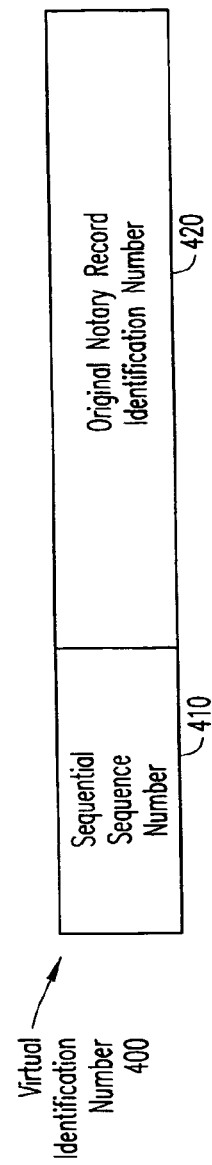
FIG. 6 illustrates an exemplary document serial number of the type inserted in a footer of the duplicate file to provide a cryptographically secure link to the original file.

Referring again to FIG. 5, the embedded PDF file $170b_2$ is input to Virtual Identification Number (VIN) logic 340 for insertion of a Virtual Identification Number (VIN) into a footer at the bottom of each page of the embedded PDF file $170b_2$. The VIN is a document serial number derivable from the Notary Record 315a for the original file 170a to provide a cryptographically secure link to the original file 170a. For example, as shown in FIG. 6, the VIN 400 can include a sequential sequence number 410 that is sequential with all other duplicated files and an identification number 420 associated with the Notary Record 315a for the original file 170a. Referring again to FIG. 5, in preferred embodiments, the footer is placed at the bottom-most section of the printable area of the page. However, placing an unobscured footer is a non-trivial task since the page may already have an existing footer, or the existing text may already take up the printable area of the page. Therefore, there may be some situations where the VIN logic 340 places the VIN in a location that obscures the text of the document. Alternatively, the VIN can be included as part of an existing footer, e.g., a page number footer. As another alternative, the VIN logic 340 can provide selectable location, font and point size to the user or automatically select the location, font and point size of the footer to fit the footer on the page. For example, the VIN logic 340 can provide the option of running the footer down the side of the document.

The PDF file $170b_1$ is further input to notarization logic 310 to produce a Notary Record 315b for the PDF file $170b_1$. The Notary Record 315b associated with the PDF file $170b_1$, along with the VIN PDF file $170b_3$ produced by the VIN logic 340, are input to additional embedding logic 350 to embed the Notary Record 315b into the VIN PDF file $170b_3$ to produce the final duplicate PDF file 170b. As discussed above, the embedding logic can be implemented as an Adobe Acrobat® plug-in capable of embedding the Notary Record 315b of the PDF file $170b_1$ into the VIN PDF file $170b_3$. It should be noted that although in preferred embodiments the Notary Records 315a and 315b are embedded in the duplicate PDF file 170b, there may be cases where the Notary Records 315a and 315b are stored separately.

Figure 8:
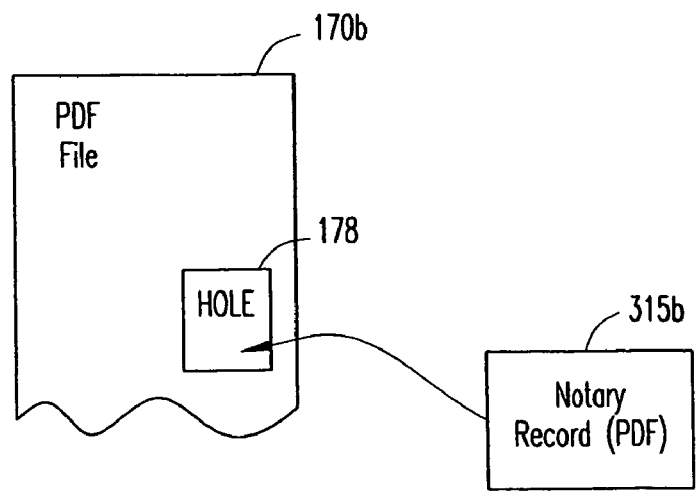
FIG. 8 is a representation of a Notary Record associated with the duplicate file embedded within the duplicate file.

In one embodiment, the Notary Record 315b for the PDF file 170b can be embedded into the PDF file 170b as shown in FIG. 8. After a "Hole" 178 is created in the PDF file 170b, the PDF file 170b is notarized by computing a hash value over everything in the PDF file 170b except the "Hole" 178. The Notary Record 315b produced from the notarization process is stored in the "Hole" 178. When validating the PDF file 170b, the hash value is again computed over everything in the PDF file 170b except the "Hole" 178. A specialized add-on to Adobe Acrobat is needed to create the "Hole" 178 and insert the Notary Record 315b into the "Hole" 178. For example, in preferred embodiments, Adobe Acrobat's Digital Signature® plug-in can be used to create the "Hole" 178 and insert the Notary Record 315b into the "Hole" 178.

Figure 9:
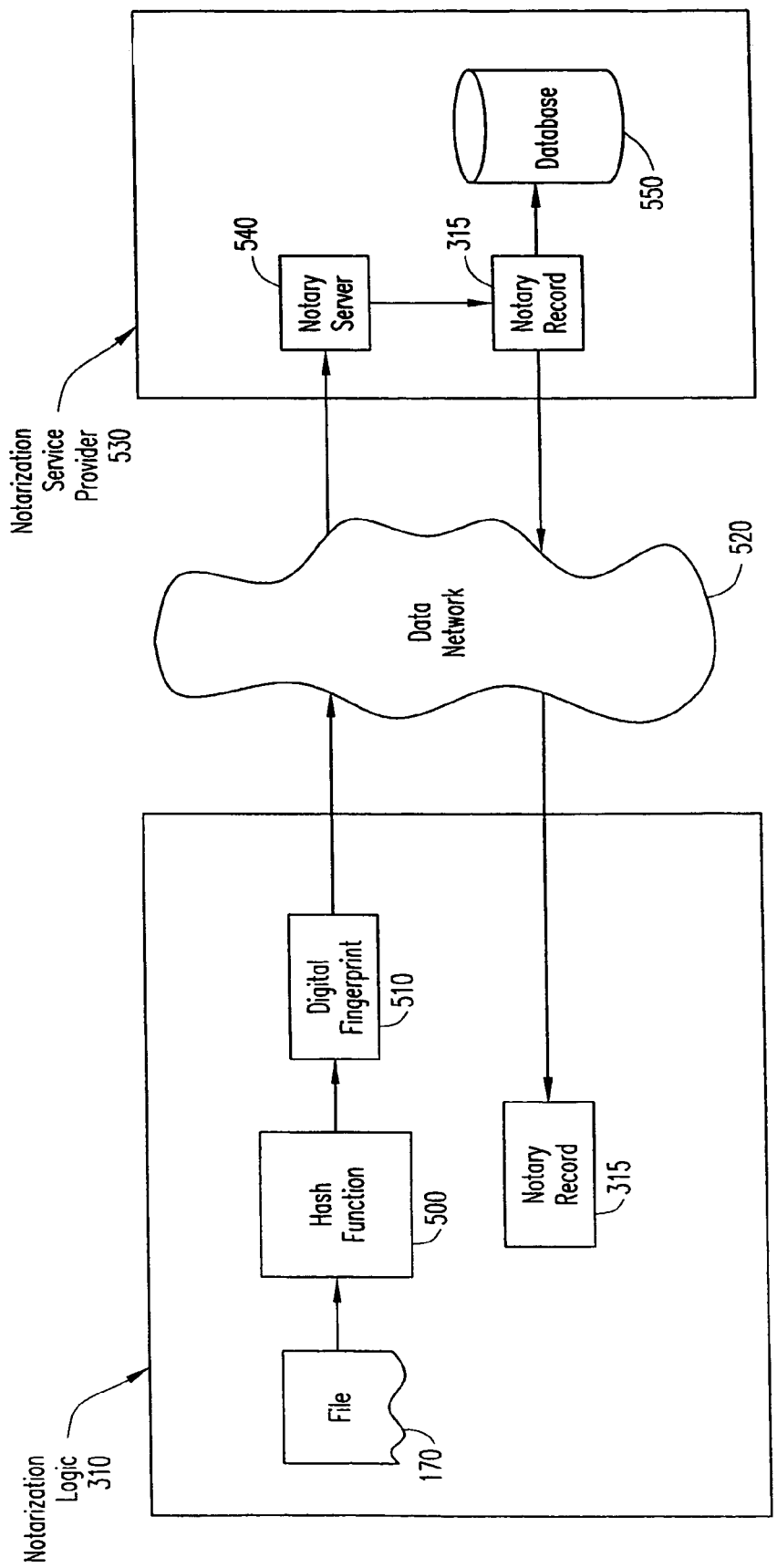
FIG. 9 is a functional block diagram illustrating exemplary functionality for notarizing a file.

The operation of the notarization logic 310 will now be described with reference to FIG. 9. The file 170 provided to the notarization logic 310 is input to a hash function 500 that produces a hash value, termed a digital fingerprint 510, of the file 170. Various methods of producing the digital fingerprint are described in the following patents, all of which are hereby incorporated by reference: Method for Secure Timestamping of Digital Documents, U.S. Pat. No. 5,136,647 and U.S. Re. 34,954; Digital Document Timestamping with Catenate Certificate, U.S. Pat. No. 5,136,646; Method of Extending the Validity of a Cryptographic Certificate, U.S. Pat. No. 5,373,561; Method of Providing Digital Signatures, U.S. Pat. No. 4,309,569; and Digital Document Authentication System, U.S. Pat. No. 5,781,629. For example, the hash function 500 can be implemented as a mathematical algorithm that transforms binary information of any size into a fixed-length record (digital fingerprint). The digital fingerprint of a file is unique in that the fingerprint changes radically with only a small change in the original digital content.

The digital fingerprint 510 is transmitted over a data network 520, such as the Internet, Intranet or LAN, to a notary server 540 within a Notary Service Provider (NSP) 530, such as Surety's Notary Server, for creation of the Notary Record 315 and storage of the Notary Record 315 in a database 550 of the NSP 530. After the fingerprint is notarized, the notary server returns the Notary Record 315 to the user. An example of a Notary Record 315 is shown in FIG. 10. The Notary Record 315 can contain the digital fingerprint 510, a timestamp 600 assigned during the notarization process, a unique identifier 610 and additional data 620 to ensure the Notary Record 315 can be validated at any time.

Figure 11:
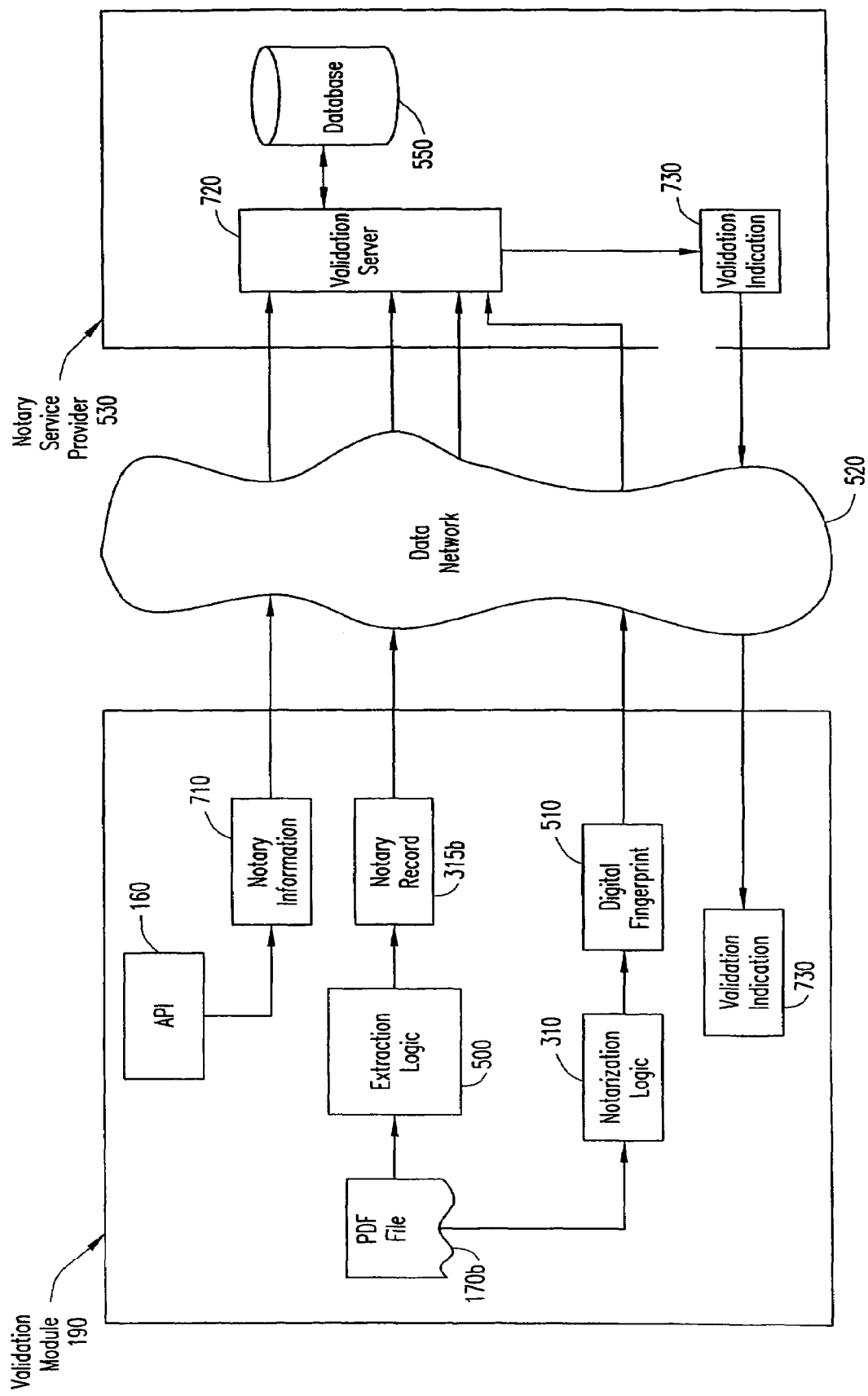
FIG. 11 is a logical representation of an exemplary log file for associating original and duplicate files.

The operation of the Validation Module 190 will now be described with reference to FIG. 11. The Validation Module 190 can validate both original files and PDF files. The processes are largely the same, and therefore, for simplicity, only the validation of PDF files is illustrated in FIG. 11. The minimal processing differences that exist between validation of the original file and validation of the PDF file can be ascertained by examination of FIGS. 18 and 19.

The Validation Module 190 can also access and display the Notary Record 315b to the user. To either view the Notary Record 315b or validate a duplicate PDF file 170b, extraction logic 700 extracts the PDF Notary Record 315b from the PDF file 170b (e.g., by retrieving the PDF Notary Record 315b from the "Hole" in the PDF file 170b). The extracted Notary Record 315b can be displayed to the user via a display device (not shown), such as a monitor, printer or other type of display, and/or used to validate the PDF file 170b. When the user requests to view the Notary Record 315b information, the user may be prompted to provide a password or other information before displaying the Notary Record 315b information in a pop-up window.

To validate the PDF file 170b, the API 160 interfaces with the Validation Module 190 to gather the appropriate notary information 710 necessary for validation to occur. For example, the notary information 710 can include the username and password for the account to charge the validation against, the name of a validation server 720 at the NSP 530 and the location of the Notary Record 315*b* in the database 550 of the NSP 530 to use (if that information is not ascertained from the extracted Notary Record 315*b*). Notarization logic 310 again produces a digital fingerprint 510 of the PDF file 170*b*, and the notary information 710, extracted Notary Record 315*b* and new digital fingerprint 510 are transmitted via a data network 520, such as the Internet, Intranet or LAN, to the NSP 530. At the NSP 530, the validation server 720 accesses the database 550 to retrieve the stored Notary Record 315*b* associated with PDF file 170*b* (as determined from the received extracted Notary Record 315*b* and/or the notary information 710) and compares the stored digital fingerprint with the new received digital fingerprint. Upon completion of the validation transaction, the validation server 720 passes back a validation indication 730 to the user indicating success or failure of the validation.

In one embodiment, the Validation Module 190 can be implemented at least in part by Adobe Acrobat 5.0®. Acrobat 5.0® enables viewing and printing of PDF documents. When viewing a notarized PDF file, the user may wish to validate that file or examine the associated Notary Record information without having to launch another application. Therefore, Acrobat's® functionality can be extended through the development of a specialized plug-in that is aware of Notary Records and validation operations. Users with notarized PDF files can install a specially built and designed digital notary validation plug-in with their copy of the Acrobat 5.0® application. The digital notary validation plug-in would be loaded when the Acrobat 5.0® Application is launched.

The digital notary validation plug-in can display Notary Record data associated with document in an Acrobat 5.0® window. In addition, the digital notary validation plug-in can perform the validation of the file using, for example, the Digital Notary Client SDK® or and/or Surety Digital Notary.com®, when the appropriate message is received by the digital notary validation plug-in from the main Acrobat 5.0® application. Furthermore, the digital notary validation plug-in can add button and menu items as appropriate to the standard Acrobat 5.0® user interface to advertise its functionality. For example, when attempting to validate, the digital notary validation plug-in can present user dialog boxes to gather the appropriate information necessary for validation to occur.

Figure 13:
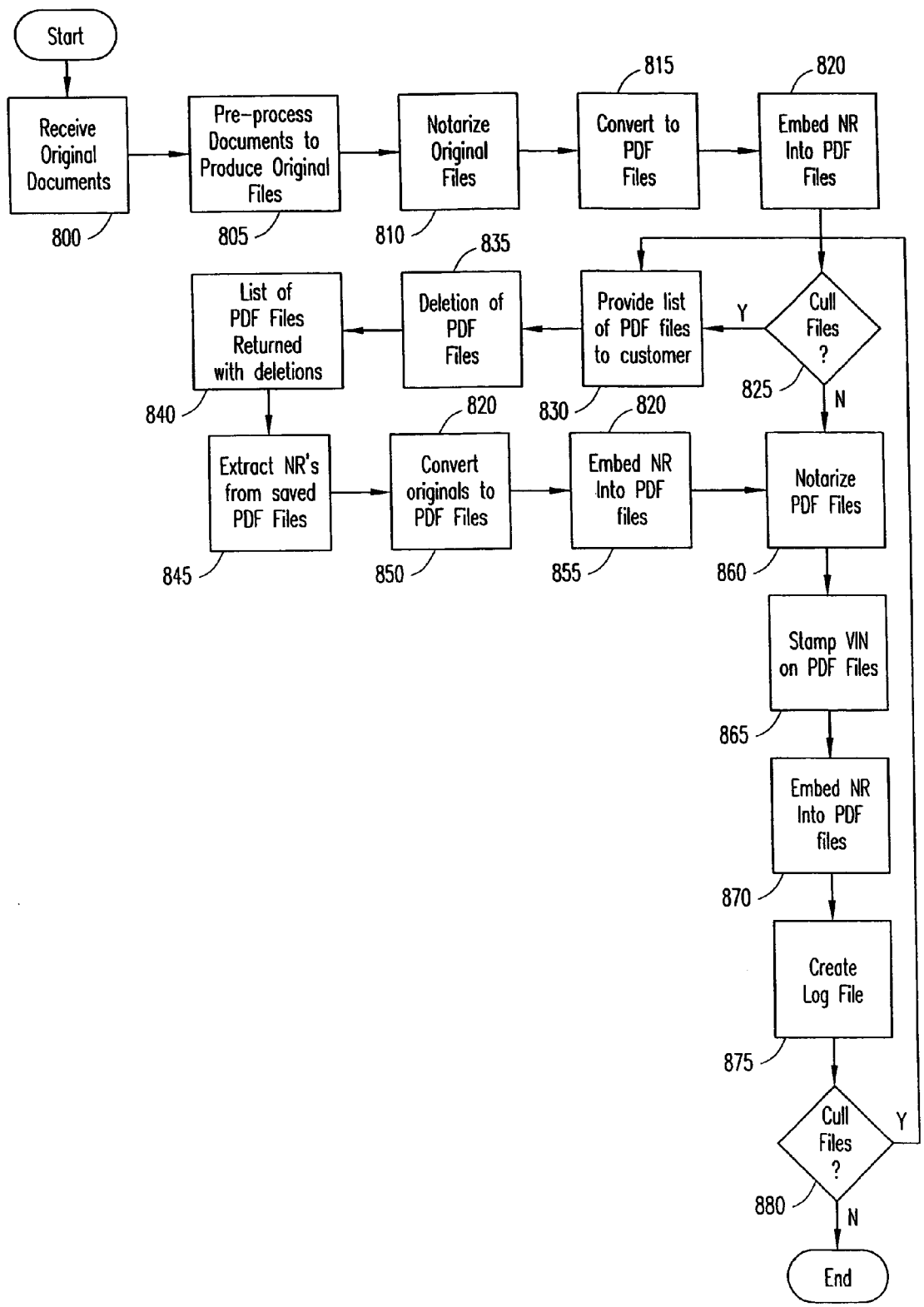
FIG. 13 is a flowchart illustrating exemplary steps for securely creating duplicate files in accordance with embodiments of the present invention.

The SDP process will now be discussed in more detail with reference to the steps listed in FIG. 13. Initially, the SDP system receives original documents from a customer (step 800). For example, the SDP system can receive the original documents from the customer on a disk, tape drive or CD ROM, or receive the original documents from the customer via a data network. Alternatively, the SDP system can retrieve the original documents directly from the customer's server and process the original documents at an SDP system site. Alternatively, the SDP system can be implemented at the customer site and the original documents can be processed directly at the customer site.

Once all of the relevant original documents have been received, any compound documents are pre-processed to produce original files, each containing only one component document (step 805). Each of the original files is then notarized (step 810) and converted to PDF files (step 815). The Notary Records for each of the notarized original files are embedded into their respective duplicate PDF files for later retrieval and validation (step 820). At any point in this process, the customer may have the opportunity to cull (delete) files (step 825) that the customer does not want to have processed. For simplicity, FIG. 13 has included step 825 only once after the embedding of the PDF files. If the customer desires to cull files, a list of files (here PDF files) is provided to the customer (step 830). From this list, the customer selects certain files to be removed from processing (step 835). For example, to cull a file, a customer can make a written indication that a file should be deleted on a print-out of the list of files, delete the duplicated PDF file from a digital list of PDF files, or use a graphical tool built on top of the repository database to delete the desired files from a list of files or delete the actual desired files.

Once the list of files with deletions indicated is returned to the SDP system (step 840), the SDP system deletes the indicated files (if not already done) and extracts the Notary Records from the saved PDF files (step 845). The original files associated with the saved PDF files are again converted to PDF files (step 850) and the previously extracted Notary Records are again embedded into their associated newly converted PDF files (step 855). With the final set of duplicate PDF files, the PDF files are notarized (step 860) and the files are sequentially numbered and individually stamped with sequential VINs to cryptographically link the duplicate PDF files to their associated original files (step 865).

Finally, the PDF Notary Record is embedded into the PDF file stamped with the appropriate VIN (step 870), and a log file is created mapping the duplicate PDF files to their associated original files (step 875). If the customer desires to cull the final list of duplicate files (step 880), the culling process is repeated (steps 830-855), and the duplicate PDF files are again notarized (step 860) and sequenced (step 865). The results of the digital photocopying process are duplicate PDF files and Notary Record files that can be delivered in a directory specified by the customer. In addition to the duplicate PDF files, the original files and the log file may also be included in the deliverable directory. Preferably, the deliverable directory includes everything necessary for the receiver of a document set to validate the document timestamps, view the documents, their embedded Notary Records and Virtual Identification Numbers and to search those documents for the desired information, using an appropriate searching tool, such as, e.g., dtSearch®.

Figure 14:
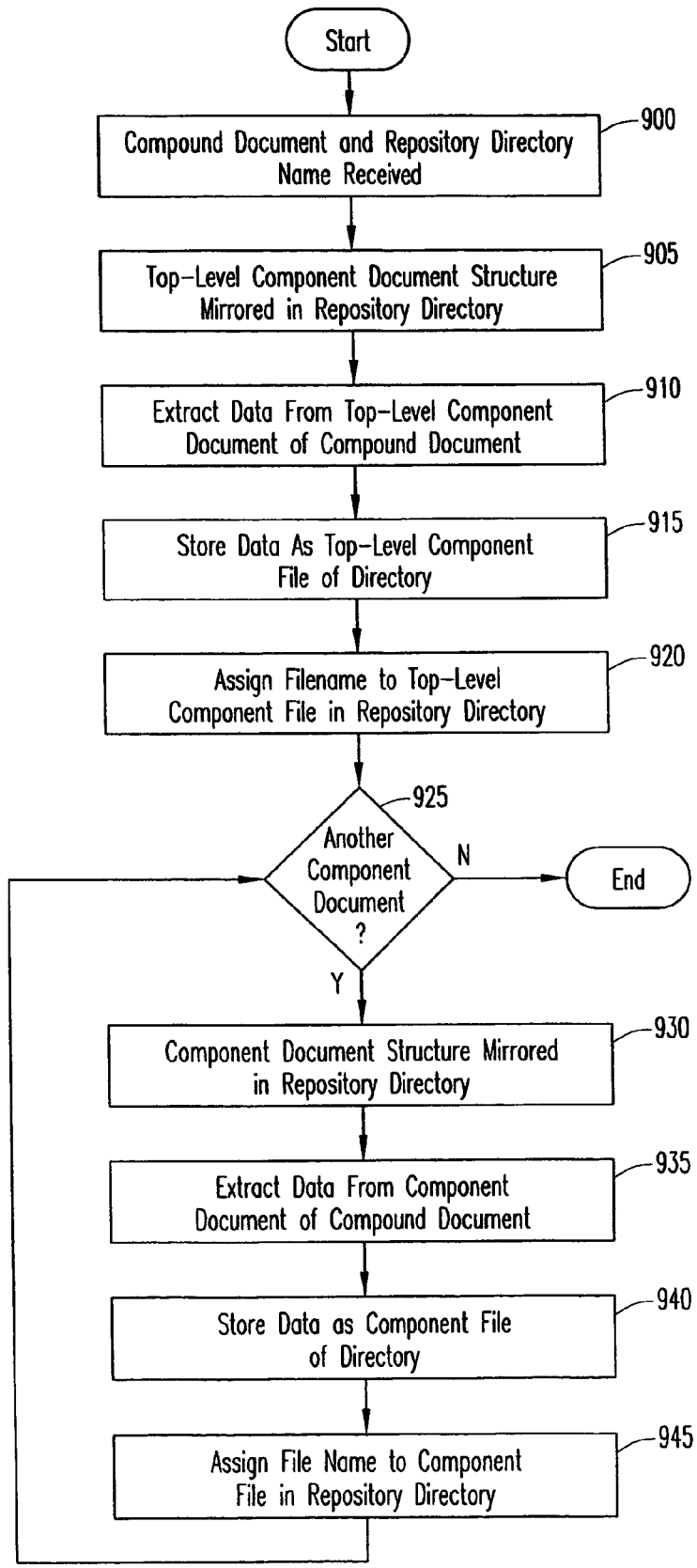
FIG. 14 is a flowchart illustrating exemplary steps for pre-processing documents for input to the SDP system of the present invention.

The pre-processing process will now be described in more detail with reference to FIG. 14. The SDP system receives a compound document and the name of a directory in the originals repository where the extracted component documents will be stored (step 900). To save the component documents under the directory assigned to the compound document, the SDP system begins with the top-level component document (e.g., folder) of the compound document and mirrors the structure of the top-level component document in the specified directory (step 905). For example, PST files are organized similar to a file system hierarchy where there are folders and items. PST files can be viewed as a tree where folders are branches and items are leafs. Items can be of many different types (e.g., contact items, mail message items, note items, etc.). Folders are used as an organizational tool and can hold other folders and/or items. Each folder has a default item type that it is designed to hold. The folder structure of the top-level folder is mirrored in the originals repository as directory/subdirectory/file to maintain the relationship between the component documents. In addition, the user can be presented with the option to select or deselect the different content types in a PST file. By selecting a content type, the SDP system will extract items of only that type from the PST file during the PST expansion stage.

Thereafter, the SDP system extracts the data within top-level component document (step 910), and stores the data within the top-level component document as an original file in the top-level of the directory assigned to the compound document (step 915). For example, if the top-level folder contains an e-mail message item, the body of the mail message can be stored as a text file, MSG file, Microsoft Word Document file, RTF file, HTML file or Vcard file. Alternatively, the user can designate a specific extraction method for all files in a specified folder, that overrides the extraction method that would normally be used based on the extension of the files in the folder. For example, the extraction method could be specified by using the three letter extension of the file format that files in a particular folder should be interpreted as. For example, a folder known to contain spreadsheet files and spreadsheet files only can be set as "xls."

The original file is saved under a filename that is unique to that particular file (step 920). For example, if the original file contains an e-mail message, the filename can be derived from the unique identifier that Exchange® assigns to each e-mail message item. The identifier is preferred over the subject of the e-mail message as the filename due to the fact that subject names do not have to be specified at all, subject names do not have to be unique and the identifier assigned by Exchange® can be used to find the original e-mail message easily. Alternatively, files expanded from PST folders can be given numerical names starting with I and incrementing for each new expanded file.

Once the top-level component document is saved in the originals repository, the SDP system determines if there are any other component documents within the compound document (step 925). For example, other component documents can be within the top-level folder of the PST file or within a sub-folder of the PST file. For each additional component document, the component document structure is mirrored in the originals repository directory assigned to the compound document (step 930), the data is extracted from the component document (step 935) and stored as a component file in the directory (step 940) with a filename assigned by the SDP system (step 945).

As an example, if the compound document is an e-mail message that contains attachments, a sub-directory is created with the identifier of the e-mail message combined with the word "attachments," and the attachments for the e-mail message are stored in that sub-directory. Alternatively, e-mail attachments can be placed in the same directory as the e-mail message they were attached to. The first part of the attachment's filename can be the filename of the e-mail message itself, and the second part can be the name of the attachment file as it was set in the original e-mail message.

Figure 15:
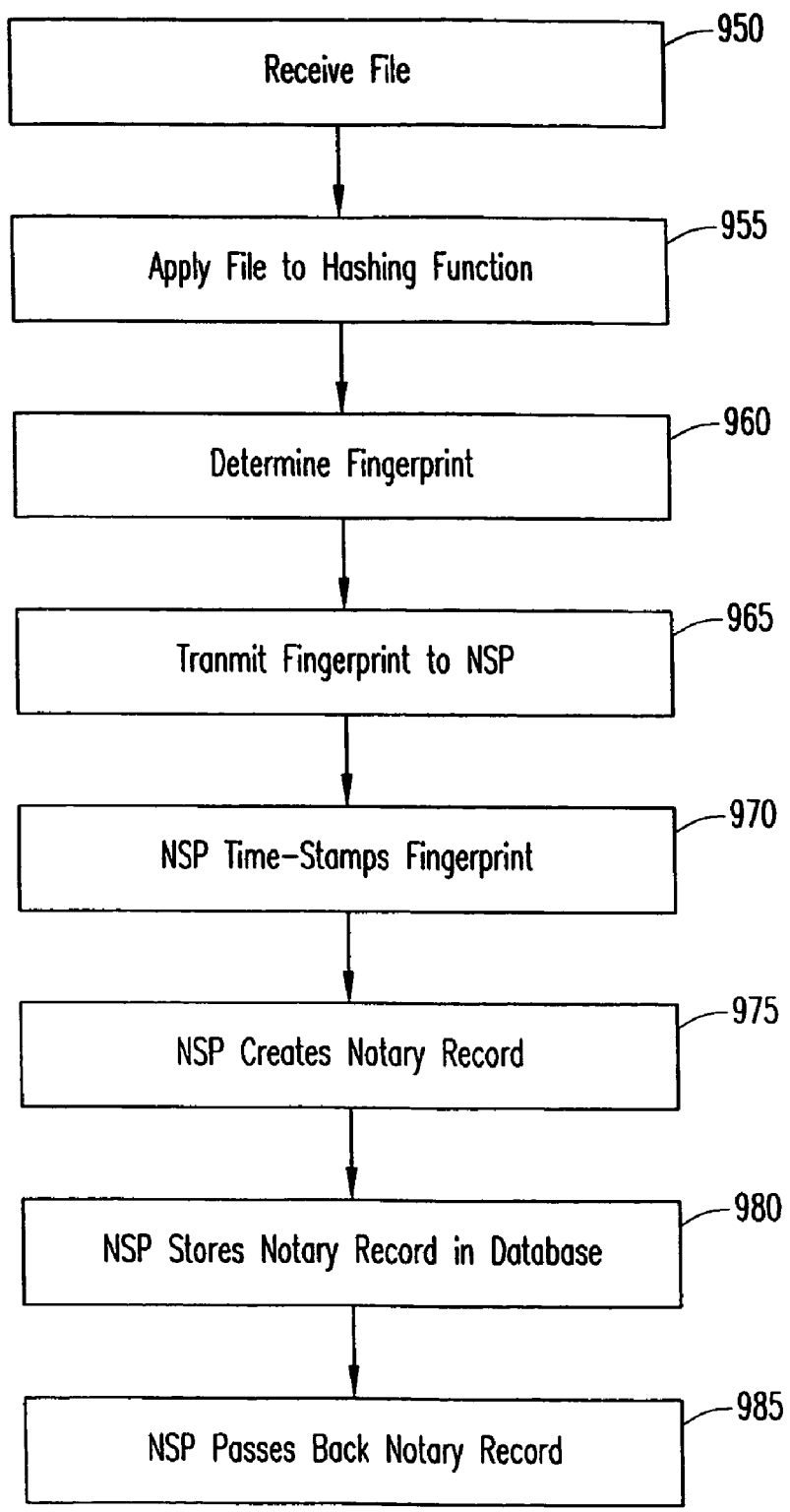
FIG. 15 is a flowchart illustrating exemplary steps for notarizing a document.

FIG. 15 illustrates the basic steps for notarizing an original file or a PDF file. Upon receipt of the file (step 950), the SDP system applies a one-way hashing function to the file (step 955) to determine a hash value, termed a digital fingerprint (step 960). The digital fingerprint is transmitted via a data network to a Notary Service Provider (NSP) (step 965), which timestamps the digital fingerprint (step 970) and creates a Notary Record for the file (step 975). The Notary Record is stored in a notary database (step 980) and passed back to the SDP system (step 985) for later use in validating the file. The Notary Record preferably contains the timestamp (e.g., the exact moment of notarization). In addition, the database is preferably organized by time, so that the entry in the database for the Notary Record is the time indicated by the timestamp.

Figure 16:
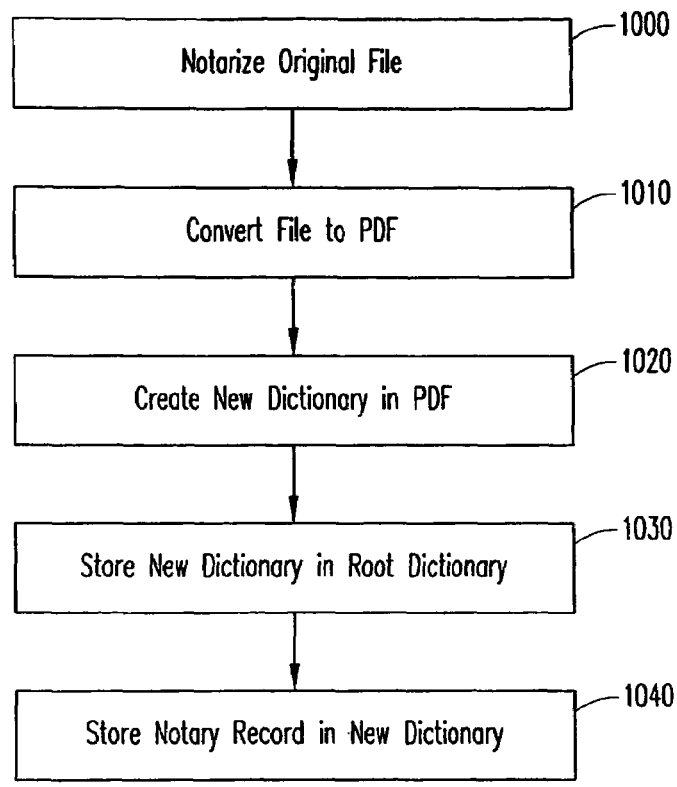
FIG. 16 is a flowchart illustrating exemplary steps for embedding a Notary Record associated with the original file into the duplicate file.

FIG. 16 illustrates the process of embedding a Notary Record associated with the original file into the duplicate PDF file. Once the original file is notarized (step 1000), the original file is converted to a PDF file, and a new "Dictionary" is created for the PDF file. The new "Dictionary" is stored in the "Root Dictionary" of the PDF file and the Notary Record for the original file is inserted into the new "Dictionary". The new "Dictionary" preferably has a name known to the SDP system for later use in retrieving the original Notary Record.

Figure 17:
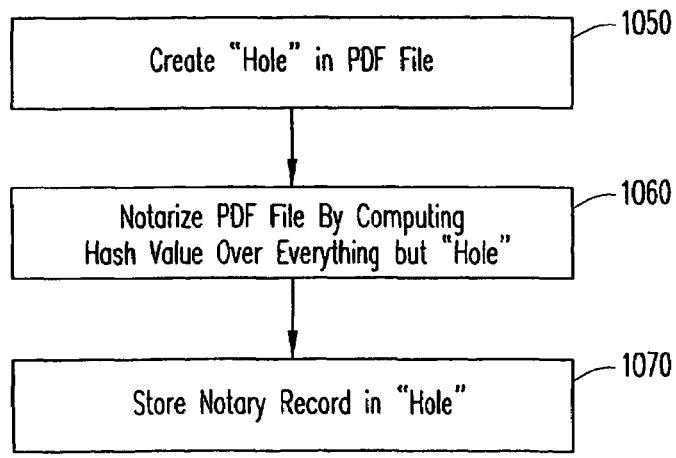
FIG. 17 is a flowchart illustrating exemplary steps for embedding a Notary Record associated with the duplicate file into the duplicate file.

FIG. 17 illustrates the process for embedding a Notary Record associated with the duplicate PDF file into the duplicate PDF file. Initially, a "Hole" is created in the PDF file (1050), where the Notary Record will later be inserted. Thereafter, the hash value is computed over everything in the PDF file except the "Hole" (step 1060). The hash value is submitted to the NSP for notarization, and the resulting Notary Record is stored in the "Hole" created in step 1050 (step 1060).

Figure 18:
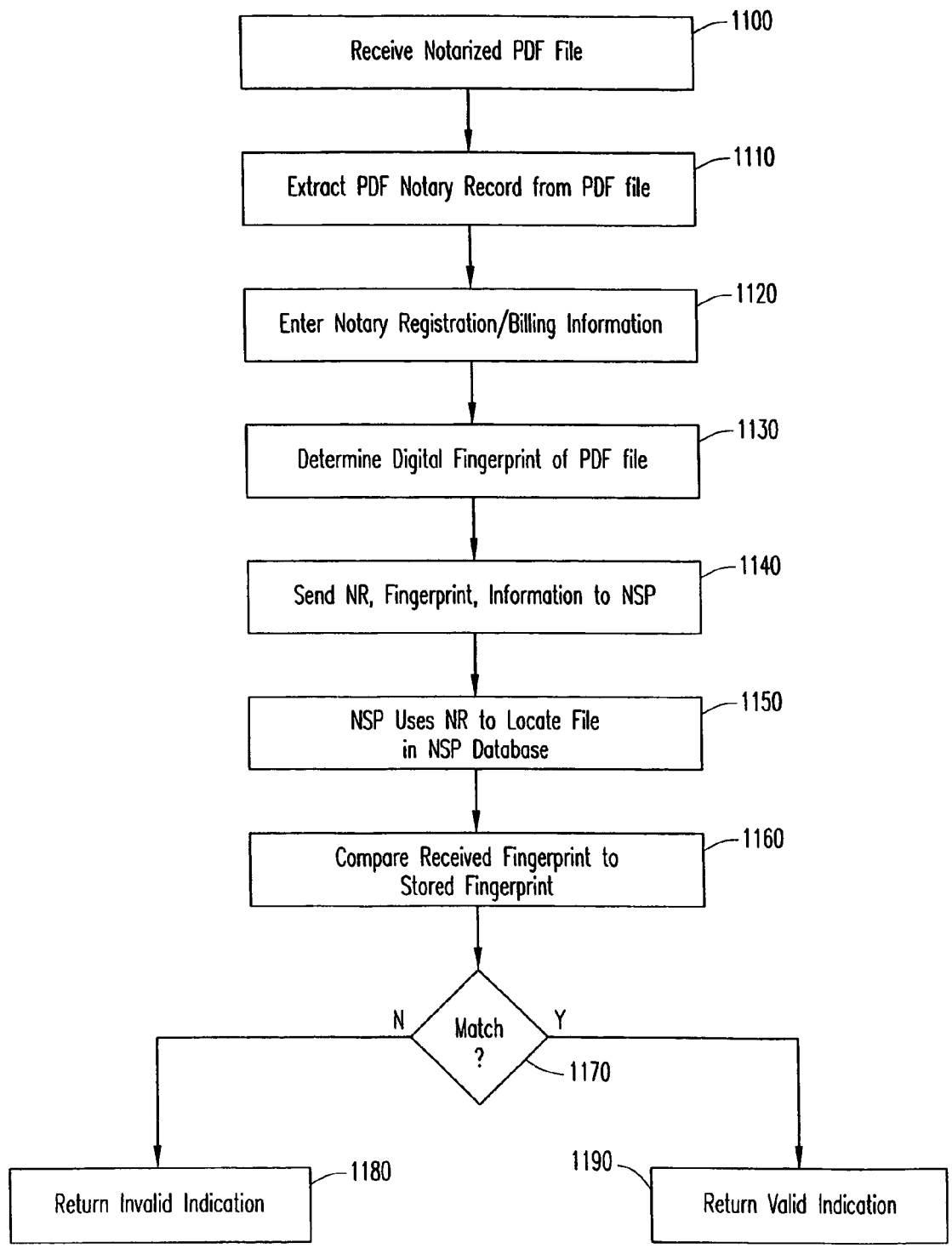
FIG. 18 is a flowchart illustrating exemplary steps for validating a duplicate file created in accordance with embodiments of the present invention.

FIG. 18 illustrates the process for validating a duplicate PDF file created using the SDP system. To validate a notarized, duplicate PDF file (step 1100), the PDF Notary Record is extracted from the PDF file (step 1110) (e.g., by retrieving the Notary Record from the "Hole" in the PDF file). In addition, a user desiring the validation of the PDF file enters the appropriate information necessary for validation to occur (step 1120). For example, this information can include the username and password for the account to charge the validation against, the name of the validation server, and the location of the Notary Record to use. Thereafter, a new digital fingerprint of the PDF file is ascertained (e.g., using a client application provided by Surety, Inc.) (step 1130), and the extracted Notary Record, entered notary information and new digital fingerprint are sent to the Notary Service Provider (NSP) (step 1140). The NSP uses the timestamp information in the Notary Record to locate the stored Notary Record in the notary database (step 1150), and compares the received digital fingerprint to the stored digital fingerprint (step 1160). If the two digital fingerprints match (step 1170), the NSP returns a valid indication to the user (step 1190). Otherwise, the NSP returns an invalid indication to the user (step 1180).

Figure 19:
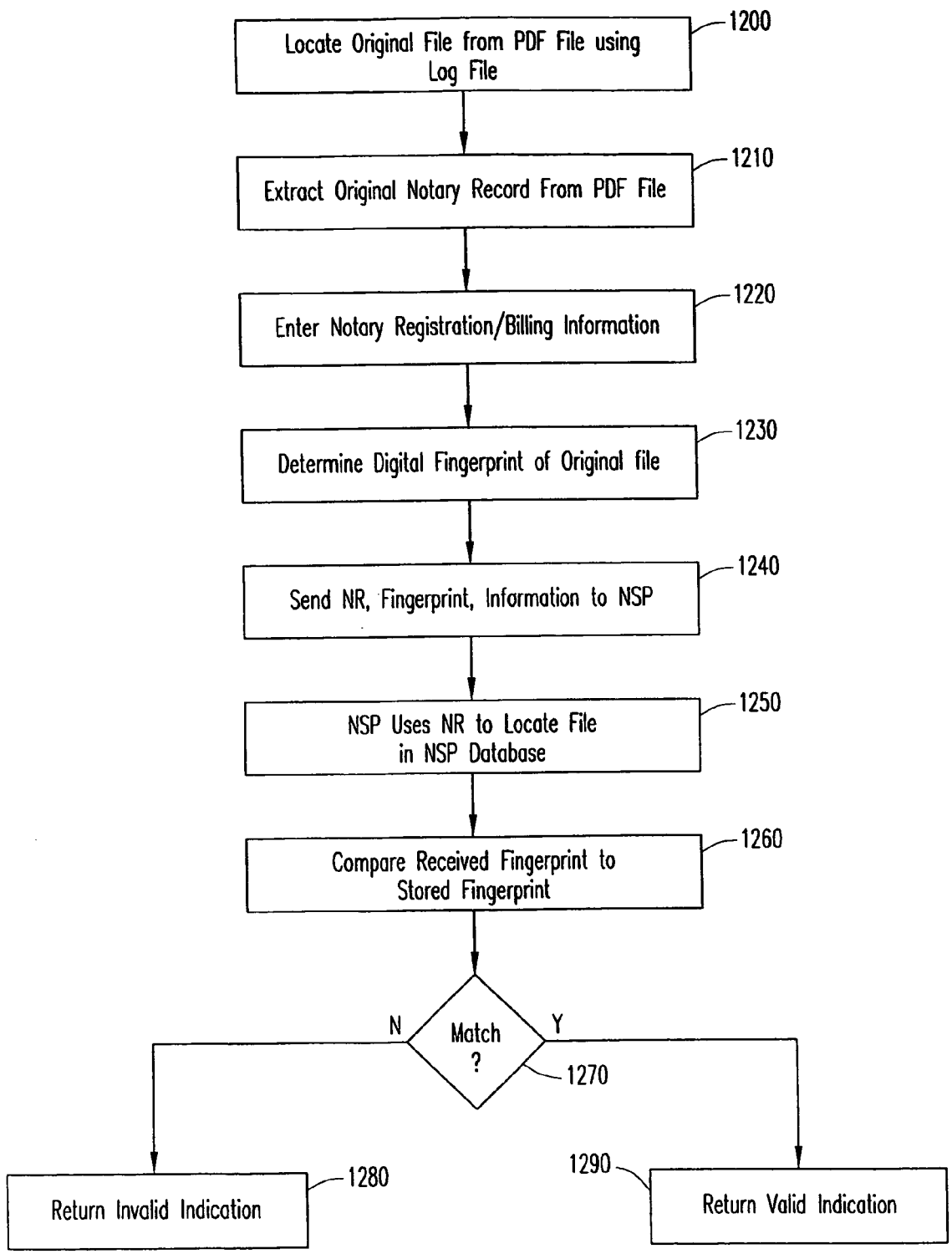
FIG. 19 is a flowchart illustrating exemplary steps for validating an original file from the duplicate file created in accordance with embodiments of the present invention.

FIG. 19 illustrates the process for validating an original file from the duplicate PDF file created by the SDP system. To determine the original file associated with the duplicate PDF file, the log file is accessed to map the sequenced filename of the duplicate PDF file to the filename of the original file (step 1200). Once the original file is located, the original Notary Record associated with the original file is extracted from the PDF file (step 1210) (e.g., by retrieving the Notary Record from the new "Dictionary" in the PDF file). In addition, a user desiring the validation of the PDF file enters the appropriate information necessary for validation to occur (step 1220). Thereafter, a new digital fingerprint of the original file is ascertained (step 1230), and the extracted original Notary Record, entered notary information and new digital fingerprint are sent to the NSP (step 1240). The NSP uses the timestamp information in the original Notary Record to locate the stored Notary Record for the original file in the notary database (step 1250), and compares the received digital fingerprint to the stored digital fingerprint (step 1260). If the two digital fingerprints match (step 1270), the NSP returns a valid indication to the user (step 1290). Otherwise, the NSP returns an invalid indication to the user (step 1280).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A system for duplicating documents of disparate types for facilitating searching of such documents, said system comprising:

storage means for storing at least one original file, each containing no more than one original document, said original file being in a first format;

processing means for determining that said original document is a component document of a compound document, extracting said component document from said compound document and storing said component document in said original file; and conversion means for converting said original file from said first format to a canonical format thereby generating a duplicate file containing a duplicate document of said original document, whereby searching of such documents is facilitated.

2. The system of claim 1, wherein said storage means has a directory structure, said component document being stored in said storage means under a directory associated with said compound document.

3. The system of claim 2, further comprising:
duplicate storage means for storing said duplicate file, said duplicate storage means having a directory structure identical to the directory structure of said storage means storing said original file.

4. The system of claim 2, wherein said compound document includes an additional component document, said processing means further for extracting said additional component document from said compound document and storing said additional component document in an additional original file in said storage means under said directory associated with said compound document in a hierarchical format designed to preserve the hierarchical relationship between said component document, said additional component document and said compound document.

5. The system of claim 4, wherein said component document and said additional component document are stored in a sub-directory of said directory associated with said compound document.

6. The system of claim 1, wherein said canonical format is the Portable Document Format (PDF), and further comprising:
searching means for enabling full-text searching of said duplicate documents.

7. The system of claim 1, wherein said compound document is an electronic mail folder, an electronic mail message having one or more attachments thereto, an electronic mail message having one or more additional electronic mail messages embedded therein, an execution file or a zip file.

8. The system of claim 1, further comprising:
appending means for appending a filename to said original file; and
renaming means for renaming said duplicate file in a sequenced format based on said filename of said original file.

9. The system of claim 1, further comprising:
selection means for enabling selection of said component document from said compound document for storage in said storage means.

10. A system for validating the authenticity of digital documents of disparate types, comprising:
storage means for storing a duplicate file containing a duplicate document of an original document in an original file having an original format, said duplicate file having a canonical format;
embedding means for embedding notary data associated with said duplicate file within said duplicate file; and
validation means for authenticating said duplicate file using at least said notary data associated with said duplicate file.

11. The system of claim 10, wherein said embedding means for embedding said notary data associated with said duplicate file into said duplicate file further comprises:
creation means for creating a hole in said duplicate file;
original notarization means for determining said notary data associated with said duplicate file by computing a hash value over the contents of said duplicate file excluding said hole; and
storage means for storing said notary data associated with duplicate file within said hole.

12. The system of claim 11, wherein said validation means further comprises:
extraction means for extracting said notary data associated with said duplicate file from said hole;
validating notarization means for determining new notary data associated with said duplicate file by computing an additional hash value over the contents of said duplicate file excluding said hole; and
comparison means for enabling comparison of said extracted notary data with said new notary data to authenticate said duplicate file.

13. A system for validating the authenticity of an original document from a duplicate document of said original document, comprising:
storage means for storing an original file containing said original document and a duplicate file containing said duplicate document, said original file having an original format, said duplicate file having a canonical format;
embedding means for embedding notary data associated with said original file within said duplicate file; and
validation means for authenticating said original file using at least said notary data associated with said original file.

14. The system of claim 13, wherein said validation means further comprises:
determining means for determining said original file from said duplicate file;
extraction means for extracting said notary data associated with said original file from said duplicate file;
notarization means for determining new notary data associated with said original file; and
comparison means for comparing said new notary data with said extracted notary data to authenticate said original file.

15. A method for duplicating digital documents of disparate types for facilitating searching of such documents, comprising the steps of:
determining whether an original document is a component document of a compound document;
if said original document is a component document, extracting said original document from said compound document;
storing said original document in an original file within a computer system, said original file being in an original format; and
converting said original file from said original format to a canonical format, thereby generating a duplicate file containing a duplicate document of said original document, whereby the searching of such documents is facilitated.

16. The method of claim 15, wherein said step of storing further comprises the step of:
storing said original file and said duplicate file in identical directory structures.

17. The method of claim 16, wherein said compound document includes an additional component document, and further comprising the steps of:

extracting said additional component document from said compound document; and storing said additional component document in an additional original file under a directory associated with said compound document in a hierarchical format designed to preserve the hierarchical relationship between said component document, said additional component document and said compound document.

18. The method of claim 17, wherein said step of storing said additional component document further comprises the step of:

storing said component document and said additional component document in a sub-directory of said directory associated with said compound document.

19. The method of claim 15, wherein said canonical format is the Portable Document Format (PDF), and further comprising the step of:

enabling full-text searching of said duplicate documents.

20. The method of claim 15, further comprising the steps of:

appending a filename to said original file; and renaming said duplicate file in a sequenced format based on said filename of said original file.

21. The method of claim 15, further comprising the step of:

enabling selection of said component document from said compound document for file conversion and storage.

22. A method for validating the authenticity of digital documents of disparate types, comprising the steps of:

retrieving, by a processor, a duplicate file containing a duplicate document of an original document in an original file having an original format, said duplicate file having a canonical format, said duplicate file further having notary data associated with said duplicate file embedded within said duplicate file; and authenticating, by said processor, said duplicate file using at least said notary data associated with said duplicate file.

23. The method of claim 22, wherein said notary data is embedded into a hole within said duplicate file, said notary data being determined by computing a hash value over the contents of said duplicate file excluding said hole.

24. The method of claim 23, wherein said step of authenticating further comprises the steps of:

extracting said notary data associated with said duplicate file from said hole;

determining new notary data associated with said duplicate file by computing an additional hash value over the contents of said duplicate file excluding said hole; and enabling comparison of said extracted notary data with said new notary data to authenticate said duplicate file.

25. A method for validating the authenticity of an original document from a duplicate document of said original document, said method comprising the steps of:

retrieving, by a processor, a duplicate file containing a duplicate document of an original document in an original file having an original format, said duplicate file having a canonical format, said duplicate file further having notary data associated with said original file embedded within said duplicate file; and authenticating, by said processor, said original file using at least said notary data associated with said original file.

26. The method of claim 25, wherein said step of authenticating further comprises the steps of:

determining said original file from said duplicate file;

extracting said notary data associated with said original file from said duplicate file;

determining new notary data associated with said original file; and comparing said new notary data with said extracted notary data to authenticate said original file.

27. A duplicate document of an original document, comprising:

at least one page displayed on a display coupled to a computer apparatus;

a footer at the bottom of each said at least one page; and a unique sequence number inserted in said footer, said unique sequence number including at least a portion of notary data associated with the original document to provide a cryptographically secure link between the duplicate document and the original document.

* * * * *